United States Patent
Lee

(10) Patent No.: US 11,358,053 B1
(45) Date of Patent: Jun. 14, 2022

(54) METHOD FOR PROVIDING GAME OF CONQUERING BUILDING BY USING GLOBAL POSITIONING SYSTEM BASED ON REAL MAP AND SERVER USING THE SAME

(71) Applicant: Astorm Inc., Seoul (KR)

(72) Inventor: Ho Jun Lee, Yongin-si (KR)

(73) Assignee: Astorm Inc., Seoul (KR)

( * ) Notice: Subject to any disclaimer, the term of this patent is extended or adjusted under 35 U.S.C. 154(b) by 0 days.

(21) Appl. No.: 17/529,971

(22) Filed: Nov. 18, 2021

(30) Foreign Application Priority Data

Nov. 24, 2020 (KR) .................. 10-2020-0159364

(51) Int. Cl.
*A63F 13/216* (2014.01)
*A63F 13/65* (2014.01)
(Continued)

(52) U.S. Cl.
CPC ............ *A63F 13/216* (2014.09); *A63F 13/44* (2014.09); *A63F 13/58* (2014.09); *A63F 13/65* (2014.09);
(Continued)

(58) Field of Classification Search
CPC ........ A63F 13/216; A63F 13/44; A63F 13/58; A63F 13/65; A63F 13/67; A63F 13/79; A63F 13/822; H04W 4/02
See application file for complete search history.

(56) References Cited

U.S. PATENT DOCUMENTS 9,916,693 B1 * 3/2018 Carr .................. G06T 11/206
2012/0244945 A1 9/2012 Kolo et al.
(Continued)

FOREIGN PATENT DOCUMENTS

KR 10-2015-0085185 A 7/2015

OTHER PUBLICATIONS

"The android game tiangun and webtoon "goso" finally met!!" blog webpage; retreived Oct. 25, 2016; 26 pages with Translation; https://blog.naver.com/wjdgks852/220845463485.
(Continued)

*Primary Examiner* — Yingchuan Zhang
(74) *Attorney, Agent, or Firm* — Young Basile Hanlon & MacFarlane, P.C.

(57) ABSTRACT

A method for providing a game for conquering virtual buildings on virtual maps corresponding to actual buildings on actual maps includes steps of: a game server (a) determining location information of a first player from a GPS signal, displaying the virtual maps with the virtual buildings and displaying building metadata and combat power data corresponding to a specific virtual building, (b) requesting the first player who requested a siege battle to pay siege battle fees or select siege battle requesting contents, and (c) displaying total combat powers of participating characters selected by the first player and a second player corresponding to a current owner of the specific virtual building, wherein profit distribution algorithms provide at least part of a portion of game profits generated from the siege battle fees and the siege battle requesting contents belonging to the specific virtual building or a specific virtual region to the current owner.

26 Claims, 7 Drawing Sheets

(51) Int. Cl.
    *A63F 13/67*     (2014.01)
    *A63F 13/58*     (2014.01)
    *A63F 13/79*     (2014.01)
    *A63F 13/822*    (2014.01)
    *A63F 13/44*     (2014.01)

(52) U.S. Cl.
    CPC .............. *A63F 13/67* (2014.09); *A63F 13/79* (2014.09); *A63F 13/822* (2014.09); *A63F 2300/205* (2013.01); *A63F 2300/8082* (2013.01)

(56) References Cited

U.S. PATENT DOCUMENTS

| | | | |
|---|---|---|---|
| 2014/0155156 A1* | 6/2014 | Peck | A63F 13/79 463/31 |
| 2016/0016083 A1* | 1/2016 | Davis | A63F 13/67 463/5 |
| 2018/0345129 A1 | 12/2018 | Rathod | |

OTHER PUBLICATIONS

Breakwater Seige Guide Webpage, dated Mar. 18, 2020; 12 pages with Translation.

\* cited by examiner

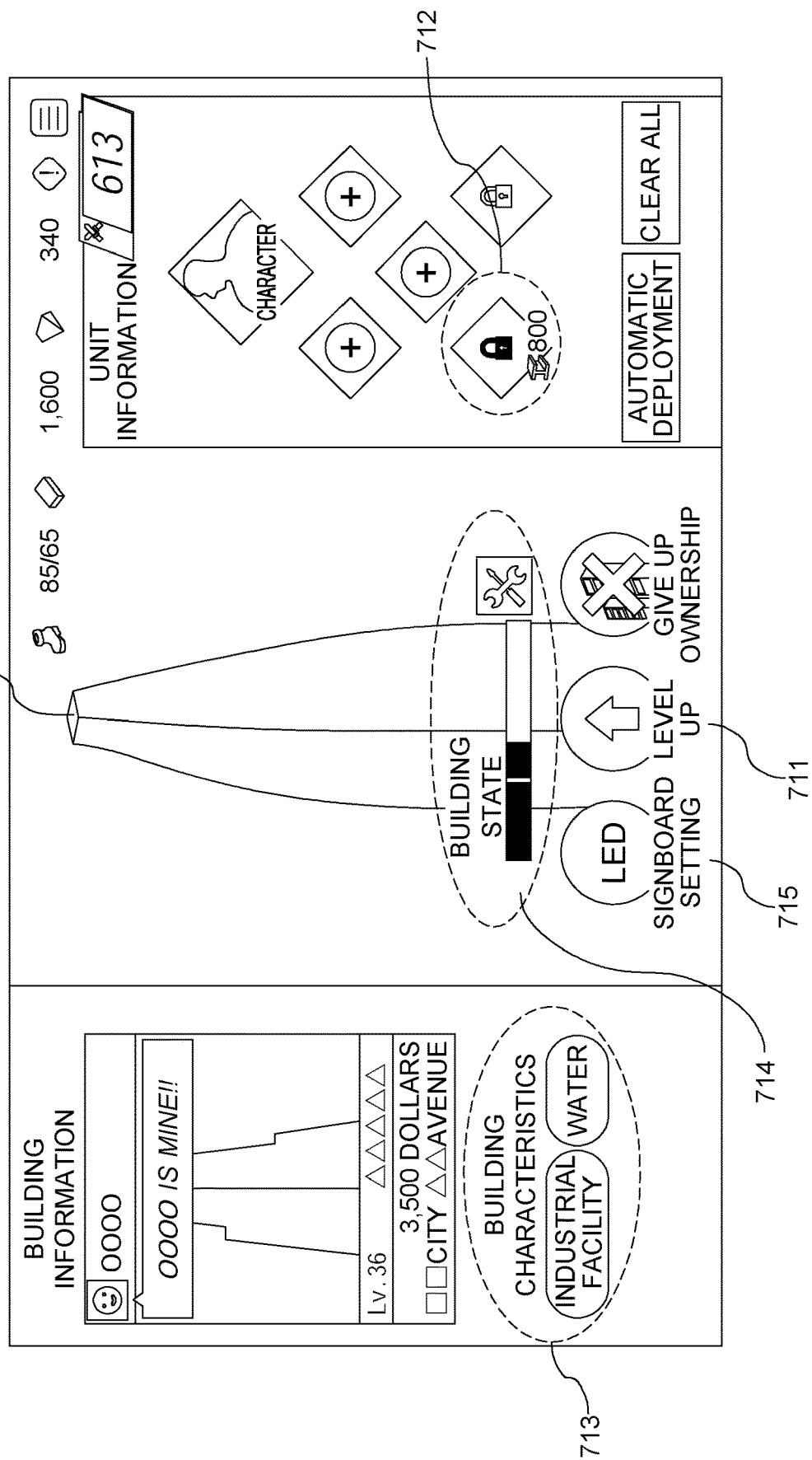

METHOD FOR PROVIDING GAME OF CONQUERING BUILDING BY USING GLOBAL POSITIONING SYSTEM BASED ON REAL MAP AND SERVER USING THE SAME

CROSS-REFERENCE TO RELATED APPLICATION(S)

This application claims priority to Korean Patent Application Serial No. KR 10-2020-0159364, filed Nov. 24, 2020, the entire disclosure of which is hereby incorporated by reference.

TECHNICAL FIELD

The present disclosure relates to a method for providing a game of conquering buildings by using a GPS (global positioning system) based on real maps and a server using the same.

BACKGROUND

As advancements of mobile technologies are gradually reducing spatial and temporal constraints in game constructions and giving rise to increased interactions among game players, various attempts are being made to fuse real-world elements into game worlds.

One dashing example of such attempts is the "Pokemon Go" game, first released in 2016, which has adopted Pokemon characters familiar to everyone in an augmented reality game. Despite relatively simple game rules and game manipulation, not only has it revived a boom in the consumption of Pokemon characters by successfully securing a wide consumer base, but has also shown new potentials for augmented reality games.

Yet, in terms of adding the real-world elements to the game worlds, a number of practical constraints still exist.

To give an example, when providing real-world spaces for playing the augmented reality games, these games should have appropriate game rules and systems to solve problems related to safety and invasions of the real-world spaces corresponding to places on the game-world spaces. Due to failures to install such secure measures, inflictions of damages to third parties not involved in the games are often reported.

Also, in order to solve the above-mentioned problems, an adequate framework that provides practical compensations to local communities for offering places to play the augmented reality games while not taking away the fun of playing the games should be devised. In reality, however, the realization of co-existence between game communities and the local communities is falling behind in comparison to the pace of the game developments.

Therefore, an enhanced method for solving the aforementioned problems is required.

SUMMARY

It is an object of the present disclosure to solve all the aforementioned problems.

It is another object of the present disclosure to provide a building conquering game, using a GPS (Global Positioning System) based on real maps, i.e., actual maps, which motivates game players to visit various places as well as provides a variety of game manipulation elements and strategic components such as character reinforcements and building reinforcements to the game players.

It is still another object of the present disclosure to provide the games players with a diversity of contents related to actual buildings and actual regions corresponding to virtual buildings and virtual regions existing in the building conquering game such that local communities are promoted to the game players visiting actual places.

In accordance with one aspect of the present disclosure, there is provided a method for providing a game of conquer of buildings by using a global positioning system (GPS) based on a real map, wherein the game of conquer is a game in which a plurality of game players, including at least one first player and at least one second player, compete for conquering one or more virtual buildings located in one or more virtual regions on one or more virtual maps corresponding to one or more actual buildings located in one or more actual regions on one or more actual maps, wherein a first state of the game of conquer represents a state in which the game players who have logged into the game of conquer are in an action of searching for a specific virtual building to visit and wherein a second state of the game of conquer represents a state in which a siege battle is in progress against the specific virtual building, including steps of: (a) a game server, during the first state, performing or supporting another device to perform processes of (i) determining location information of the first player in a virtual space by referring to a search request signal or a GPS signal corresponding to a first terminal of the first player, (ii) displaying one or more virtual buildings, available for conquering through the siege battle by the first player, on the virtual maps corresponding to the virtual space by referring to the location information of the first player, and (iii) in response to the specific virtual building on the virtual maps being selected, displaying at least part of combat power data of a defense unit deployed by a current owner of the specific virtual building and building metadata including at least part of building level data, building characteristics data, game cash acquisition rate data, item production rate data, and character buff-rate data corresponding to the specific virtual building; (b) during the first state, in response to the first player moving to a specific actual region where a specific actual building corresponding to the specific virtual building is located and transmitting a siege battle request signal for initiating the siege battle against the specific virtual building, the game server performing or supporting another device to perform a process of requesting at least part of payment action or selection action from the first player, wherein the payment action of the first player is performed by allowing siege battle fees for entering the second state to be paid and wherein the selection action of the first player is performed by allowing one or more siege battle requesting contents to be selected; and (c) in response to the first player entering the second state, the game server performing or supporting another device to perform processes of (i) displaying at least one character among a (1_1)-st character to a (1_n)-th character owned by the first player and at least one character among a (2_1)-st character to a (2_m)-th character owned by the second player corresponding to the current owner of the specific virtual building, (ii) displaying a first total combat power computed by referring to at least part of level combat power, machine combat power, skill combat power of each of a (1_1)-st participating character to a (1_i)-th participating character selected by the first player to participate in the siege battle, wherein "i" is an integer selected from integers of 1 to n, and (iii) displaying a second total combat power computed by referring to building defense power corresponding to a specific building level of the specific virtual building owned by the second player and by referring to at least part of level combat power, machine combat power, skill combat power of each of a (2_1)-st participating character to a (2_j)-th participating character selected by the second player to participate in the siege battle, wherein "j" is an integer selected from integers of 1 to m, to thereby support the siege battle between the first player and the second player to proceed.

As one example, after the step of (c), in response to detecting that an outcome on a victory or a defeat of the first player and the second player has been determined according to the first total combat power and the second total combat power, (i) in case the first player is determined as a winner of the siege battle, the game server performs or supports another device to perform processes of (i-1) determining whether to perform a first adjustment on the specific building level of the specific virtual building, (i-2) transferring ownership data of the specific virtual building from the second player to the first player, (i-3) providing at least part of building reinforcement items and level upgrades for at least one of the (1_1)-st character to the (1_n)-th character owned by the first player, as siege success rewards to the first player, and (i-4) applying level downgrades to at least one of the (2_1)-st character to the (2_m)-th character owned by the second player, as defense failure penalties to the second player, and (ii) in case the second player is determined as the winner of the siege battle, the game server performs or supports another device to perform processes of (ii-1) determining whether to perform a second adjustment on the specific building level of the specific virtual building, (ii-2) maintaining the ownership data of the specific virtual building as the second player, (ii-3) applying the level downgrades to at least one of the (1_1)-st character to the (1_n)-th character owned by the first player, as siege failure penalties to the first player, and (ii-4) providing at least part of the building reinforcement items and the level upgrades for at least one of the (2_1)-st character to the (2_m)-th character owned by the second player, as defense success rewards to the second player.

As another example, by referring to the building metadata, the game server performs or supports another device to perform processes of (i) increasing combat power of at least one character owned by the current owner of the specific virtual building at a certain rate according to the character buff-rate data corresponding to the specific virtual building, (ii) providing a certain amount of building reinforcement items every certain time interval according to the item production rate data corresponding to the specific virtual building, wherein the building reinforcement items are allowed to be used by the current owner of the specific virtual building to improve the specific building level of the specific virtual building, and (iii) providing a certain portion of game profits generated from the siege battle fees or from the siege battle requesting contents to the current owner of the specific virtual building as game cash according to the game cash acquisition rate data corresponding to the specific virtual building.

As another example, the game server performs or supports another device to perform processes of increasing the game cash acquisition rate data by referring to a duration for which the current owner has been occupying the specific virtual building, to thereby acquire an increased game cash acquisition rate data, and providing the certain portion of the game profits generated form the siege battle fees or from the siege battle requesting contents as the game cash according to the increased game cash acquisition rate data.

As another example, the game server performs or supports another device to perform a process of selecting one profit distribution algorithm from a first profit distribution algorithm and a second profit distribution algorithm to thereby perform profit distribution to the current owner of the specific virtual building, wherein the first profit distribution algorithm provides a first portion of building profits, which is at least part of the game profits generated from the siege battle fees or from the siege battle requesting contents belonging to the specific virtual building, to the current owner of the specific virtual building as the game cash, according to a first game cash acquisition rate data corresponding to the current owner of the specific virtual building, and wherein the second profit algorithm provides a second portion of regional profits, which is at least part of the game profits generated from the siege battle fees or from the siege battle requesting contents belonging to a specific virtual region having a plurality of the virtual buildings including the specific virtual building, to the current owner of the specific virtual building, as the game cash according to a second game cash acquisition rate data corresponding to the current owner of the specific virtual building.

As another example, the game server performs or supports another device to perform a process of forming the siege battle requesting contents by referring to at least part of data from (i) specific building data including at least part of information on a location of the specific actual building, store brands in the specific actual building, owners of the specific actual building, surrounding commercial districts, and users who visit the specific actual building corresponding to the specific virtual building, (ii) specific regional data including at least part of information on a location of the specific actual region, region visitors who visit the specific actual region, tourist sites near the specific actual region, surrounding commercial districts of the specific actual region in which the specific actual building is located, and (iii) specific correlation data representing correlation between the specific building data and the specific regional data.

As another example, before the step of (a), the game server performs or supports another device to perform processes of (i) classifying the virtual buildings into landmarks and general buildings by referring to building metadata of the virtual buildings located in the virtual regions on the virtual maps corresponding to the actual buildings located in the actual regions on the actual maps, wherein the building metadata includes at least part of the building level data, the building characteristics data, the game cash acquisition rate data, the item production rate data, and the character buff-rate data corresponding to the virtual buildings, and (ii) assigning higher numerical values to at least part of first character buff-rate data, first item production rate data and first game cash acquisition rate data of the landmarks as compared to at least part of second character buff-rate data, second item production rate data and second game cash acquisition rate data of the general buildings.

As another example, the game server performs or supports another device to perform processes of (i) providing a user interface that allows the current owner occupying the specific virtual building to display message contents on a signboard placed on the specific virtual building, and (ii) in response to a specific message content being entered through the user interface, supporting a display of the specific message content on the signboard placed on the specific virtual building through a screen of a terminal of another user approaching the specific virtual building at the first state.

As another example, on condition that the building characteristics data and character properties data have been classified into a first type to a z type and on condition that incompatible type pairs and superiorities between the first type to the z type have been set, the game server performs or supports another device to perform processes of (i) comparing (1_1)-st character properties data to (1_i)-th character properties data with at least part of specific building characteristics data and (2_1)-st character properties data to (2_j)-th character properties data, wherein the (1_1)-st character properties data to the (1_i)-th character properties data correspond to the (1_1)-st participating character to the (1-i)-th participating character of the first player, wherein the specific building characteristics data correspond to the specific virtual building and wherein the (2_1)-st character properties data to the (2_j)-th character properties data correspond to the (2_1)-st participating character to the (2-j)-th participating character of the second player and thus (ii) allowing attack power advantages to at least part of the (1_1)-st participating character to the (1-i)-th participating character in case at least part of the (1_1)-st character properties data to the (1-i)-th character properties data are determined as having superiorities to at least part of the specific building characteristics data and the (2_1)-st character properties data to the (2_j)-th character properties data, and (iii) allowing defense power advantages to at least part of the specific building and the (2_1)-st participating character to the (2_j)-th participating character in case at least part of the specific building characteristics data and the (2_1)-st character properties data to the (2_j)-th character properties data are determined as having superiorities to at least part of the (1_1)-st character properties data to the (1-i)-th character properties data.

As another example, in response to detecting that (i) the current owner occupying the specific virtual building has collected game cash for performing building reinforcements, (ii) the current owner has collected one or more building reinforcement items for performing the building reinforcements, and (iii) building reinforcement waiting time corresponding to a specific building level of the specific virtual building has been passed, the game server performs or supports another device to perform processes of allowing the current owner to perform the building reinforcements on the specific virtual building and thus allowing the building defense power to be increased through the building reinforcements.

As another example, the game server performs or supports another device to perform a process of allowing the current owner to shorten the building reinforcement waiting time by using one or more waiting time shortening contents, wherein the waiting time shortening contents are selected by referring to at least part of specific building data of the specific actual building corresponding to the specific virtual building, specific regional data of the specific actual region in which the specific actual building is located, and specific correlation data representing correlation between the specific building data and the specific regional data.

As another example, at the step of (a), if the location information of the first player is determined as not included in location information history of the first player, the game server performs or supports another device to perform processes of displaying one or more new region visiting contents corresponding to the location information of the first player on the first terminal of the first player, and providing one or more predetermined rewards corresponding to the new region visiting contents to the first player in a form of game cash.

As another example, at the step of (c), the game server performs or supports another device to perform processes of allowing the second player to select the (2_1)-st participating character to the (2_j)-th participating character from the (2_1)-st character to the (2_m)-th character as a regular defense unit that is allowed to participate in the siege battle regardless of whether the second player is logged in or not, and allowing the second player to increase a size of the regular defense unit by paying predetermined amounts of building reinforcement items having predetermined types.

In accordance with another aspect of the present disclosure, there is provided a game server for providing a game of conquer of buildings by using a global positioning system (GPS) based on a real map, wherein the game of conquer is a game in which a plurality of game players, including at least one first player and at least one second player, compete for conquering one or more virtual buildings located in one or more virtual regions on one or more virtual maps corresponding to one or more actual buildings located in one or more actual regions on one or more actual maps, wherein a first state of the game of conquer represents a state in which the game players who have logged into the game of conquer are in an action of searching for a specific virtual building to visit and wherein a second state of the game of conquer represents a state in which a siege battle is in progress against the specific virtual building, including: at least one memory that stores instructions; and at least one processor configured to execute the instructions to perform or support another device to perform: (I) during the first state, processes of (i) determining location information of the first player in a virtual space by referring to a search request signal or a GPS signal corresponding to a first terminal of the first player, (ii) displaying one or more virtual buildings, available for conquering through the siege battle by the first player, on the virtual maps corresponding to the virtual space by referring to the location information of the first player, and (iii) in response to the specific virtual building on the virtual maps being selected, displaying at least part of combat power data of a defense unit deployed by a current owner of the specific virtual building and building metadata including at least part of building level data, building characteristics data, game cash acquisition rate data, item production rate data, and character buff-rate data corresponding to the specific virtual building, (II) during the first state, in response to the first player moving to a specific actual region where a specific actual building corresponding to the specific virtual building is located and transmitting a siege battle request signal for initiating the siege battle against the specific virtual building, a process of requesting at least part of payment action or selection action from the first player, wherein the payment action of the first player is performed by allowing siege battle fees for entering the second state to be paid and wherein the selection action of the first player is performed by allowing one or more siege battle requesting contents to be selected, and (III) in response to the first player entering the second state, processes of (i) displaying at least one character among a (1_1)-st character to a (1_n)-th character owned by the first player and at least one character among a (2_1)-st character to a (2_m)-th character owned by the second player corresponding to the current owner of the specific virtual building, (ii) displaying a first total combat power computed by referring to at least part of level combat power, machine combat power, skill combat power of each of a (1_1)-st participating character to a (1_i)-th participating character selected by the first player to participate in the siege battle, wherein "i" is an integer selected from integers of 1 to n, and (iii) displaying a second total combat power computed by referring to building defense power corresponding to a specific building level of the specific virtual building owned by the second player and by referring to at least part of level combat power, machine combat power, skill combat power of each of a $(2\_1)$-st participating character to a $(2\_j)$-th participating character selected by the second player to participate in the siege battle, wherein "j" is an integer selected from integers of 1 to m, to thereby support the siege battle between the first player and the second player to proceed.

As one example, after the process of (III), in response to detecting that an outcome on a victory or a defeat of the first player and the second player has been determined according to the first total combat power and the second total combat power, (i) in case the first player is determined as a winner of the siege battle, the processor performs or supports another device to perform processes of (i-1) determining whether to perform a first adjustment on the specific building level of the specific virtual building, (i-2) transferring ownership data of the specific virtual building from the second player to the first player, (i-3) providing at least part of building reinforcement items and level upgrades for at least one of the $(1\_1)$-st character to the $(1\_n)$-th character owned by the first player, as siege success rewards to the first player, and (i-4) applying level downgrades to at least one of the $(2\_1)$-st character to the $(2\_m)$-th character owned by the second player, as defense failure penalties to the second player, and (ii) in case the second player is determined as the winner of the siege battle, the processor performs or supports another device to perform processes of (ii-1) determining whether to perform a second adjustment on the specific building level of the specific virtual building, (ii-2) maintaining the ownership data of the specific virtual building as the second player, (ii-3) applying the level downgrades to at least one of the $(1\_1)$-st character to the $(1\_n)$-th character owned by the first player, as siege failure penalties to the first player, and (ii-4) providing at least part of the building reinforcement items and the level upgrades for at least one of the $(2\_1)$-st character to the $(2\_m)$-th character owned by the second player, as defense success rewards to the second player.

As another example, by referring to the building metadata, the processor performs or supports another device to perform processes of (i) increasing combat power of at least one character owned by the current owner of the specific virtual building at a certain rate according to the character buff-rate data corresponding to the specific virtual building, (ii) providing a certain amount of building reinforcement items every certain time interval according to the item production rate data corresponding to the specific virtual building, wherein the building reinforcement items are allowed to be used by the current owner of the specific virtual building to improve the specific building level of the specific virtual building, and (iii) providing a certain portion of game profits generated from the siege battle fees or from the siege battle requesting contents to the current owner of the specific virtual building as game cash according to the game cash acquisition rate data corresponding to the specific virtual building.

As another example, the processor performs or supports another device to perform processes of increasing the game cash acquisition rate data by referring to a duration for which the current owner has been occupying the specific virtual building, to thereby acquire an increased game cash acquisition rate data, and providing the certain portion of the game profits generated form the siege battle fees or from the siege battle requesting contents as the game cash according to the increased game cash acquisition rate data.

As another example, the processor performs or supports another device to perform a process of selecting one profit distribution algorithm from a first profit distribution algorithm and a second profit distribution algorithm to thereby perform profit distribution to the current owner of the specific virtual building, wherein the first profit distribution algorithm provides a first portion of building profits, which is at least part of the game profits generated from the siege battle fees or from the siege battle requesting contents belonging to the specific virtual building, to the current owner of the specific virtual building as the game cash, according to a first game cash acquisition rate data corresponding to the current owner of the specific virtual building, and wherein the second profit algorithm provides a second portion of regional profits, which is at least part of the game profits generated from the siege battle fees or from the siege battle requesting contents belonging to a specific virtual region having a plurality of the virtual buildings including the specific virtual building, to the current owner of the specific virtual building, as the game cash according to a second game cash acquisition rate data corresponding to the current owner of the specific virtual building.

As another example, the processor performs or supports another device to perform a process of forming the siege battle requesting contents by referring to at least part of data from (i) specific building data including at least part of information on a location of the specific actual building, store brands in the specific actual building, owners of the specific actual building, surrounding commercial districts, and users who visit the specific actual building corresponding to the specific virtual building, (ii) specific regional data including at least part of information on a location of the specific actual region, region visitors who visit the specific actual region, tourist sites near the specific actual region, surrounding commercial districts of the specific actual region in which the specific actual building is located, and (iii) specific correlation data representing correlation between the specific building data and the specific regional data.

As another example, before the process of (I), the processor performs or supports another device to perform processes of (i) classifying the virtual buildings into landmarks and general buildings by referring to building metadata of the virtual buildings located in the virtual regions on the virtual maps corresponding to the actual buildings located in the actual regions on the actual maps, wherein the building metadata includes at least part of the building level data, the building characteristics data, the game cash acquisition rate data, the item production rate data, and the character buff-rate data corresponding to the virtual buildings, and (ii) assigning higher numerical values to at least part of first character buff-rate data, first item production rate data and first game cash acquisition rate data of the landmarks as compared to at least part of second character buff-rate data, second item production rate data and second game cash acquisition rate data of the general buildings.

As another example, the processor performs or supports another device to perform processes of (i) providing a user interface that allows the current owner occupying the specific virtual building to display message contents on a signboard placed on the specific virtual building, and (ii) in response to a specific message content being entered through the user interface, supporting a display of the specific message content on the signboard placed on the specific virtual building through a screen of a terminal of another user approaching the specific virtual building at the first state.

As another example, on condition that the building characteristics data and character properties data have been classified into a first type to a z type and on condition that incompatible type pairs and superiorities between the first type to the z type have been set, the processor performs or supports another device to perform processes of (i) comparing $(1\_1)$-st character properties data to $(1\_i)$-th character properties data with at least part of specific building characteristics data and $(2\_1)$-st character properties data to $(2\_j)$-th character properties data, wherein the $(1\_1)$-st character properties data to the $(1\_i)$-th character properties data correspond to the $(1\_1)$-st participating character to the $(1-i)$-th participating character of the first player, wherein the specific building characteristics data correspond to the specific virtual building and wherein the $(2\_1)$-st character properties data to the $(2\_j)$-th character properties data correspond to the $(2\_1)$-st participating character to the $(2-j)$-th participating character of the second player and thus (ii) allowing attack power advantages to at least part of the $(1\_1)$-st participating character to the $(1-i)$-th participating character in case at least part of the $(1\_1)$-st character properties data to the $(1-i)$-th character properties data are determined as having superiorities to at least part of the specific building characteristics data and the $(2\_1)$-st character properties data to the $(2\_j)$-th character properties data, and (iii) allowing defense power advantages to at least part of the specific building and the $(2\_1)$-st participating character to the $(2\_j)$-th participating character in case at least part of the specific building characteristics data and the $(2\_1)$-st character properties data to the $(2\_j)$-th character properties data are determined as having superiorities to at least part of the $(1\_1)$-st character properties data to the $(1-i)$-th character properties data.

As another example, in response to detecting that (i) the current owner occupying the specific virtual building has collected game cash for performing building reinforcements, (ii) the current owner has collected one or more building reinforcement items for performing the building reinforcements, and (iii) building reinforcement waiting time corresponding to a specific building level of the specific virtual building has been passed, the processor performs or supports another device to perform processes of allowing the current owner to perform the building reinforcements on the specific virtual building and thus allowing the building defense power to be increased through the building reinforcements.

As another example, the processor performs or supports another device to perform a process of allowing the current owner to shorten the building reinforcement waiting time by using one or more waiting time shortening contents, wherein the waiting time shortening contents are selected by referring to at least part of specific building data of the specific actual building corresponding to the specific virtual building, specific regional data of the specific actual region in which the specific actual building is located, and specific correlation data representing correlation between the specific building data and the specific regional data.

As another example, at the process of (I), if the location information of the first player is determined as not included in location information history of the first player, the processor performs or supports another device to perform processes of displaying one or more new region visiting contents corresponding to the location information of the first player on the first terminal of the first player, and providing one or more predetermined rewards corresponding to the new region visiting contents to the first player in a form of game cash.

As another example, at the process of (III), the processor performs or supports another device to perform processes of allowing the second player to select the $(2\_1)$-st participating character to the $(2\_j)$-th participating character from the $(2\_1)$-st character to the $(2\_m)$-th character as a regular defense unit that is allowed to participate in the siege battle regardless of whether the second player is logged in or not, and allowing the second player to increase a size of the regular defense unit by paying predetermined amounts of building reinforcement items having predetermined types.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 7 is a drawing schematically illustrating a game screen displaying information on the virtual buildings owned by the current owners to aid the current owners to reinforce the virtual buildings in accordance with one example embodiment of the present disclosure.

DETAILED DESCRIPTION

Figure 1:
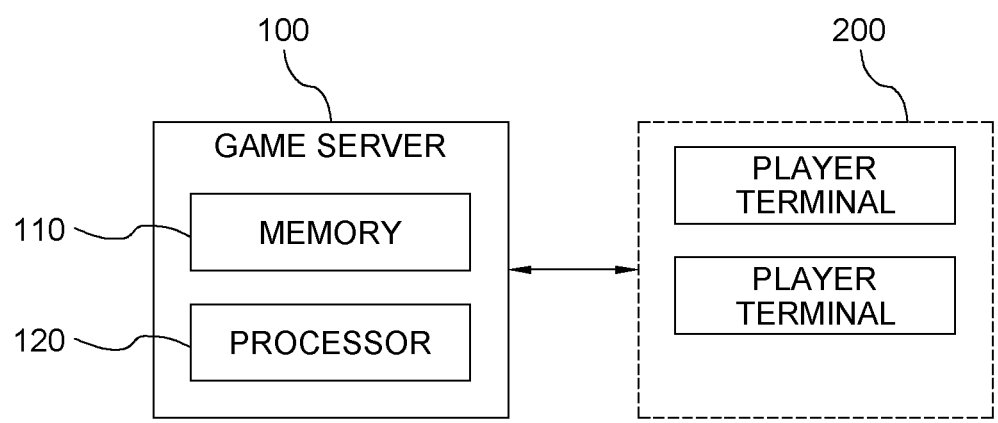
FIG. 1 is a drawing schematically illustrating a game server for providing a game of conquer of buildings by using a GPS (Global Positioning System) based on real maps, i.e., actual maps, in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples, but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a game server 100 for providing a game of conquer of buildings by using a GPS (Global Positioning System) based on real maps, i.e. actual maps, in accordance with one example embodiment of the present disclosure.

By referring to FIG. 1, the game server 100 for providing the game of conquer of buildings by using the GPS based on the actual maps may include a memory 110 and a processor 120. Herein, the memory 110 may store instructions for the processor, and in detail, the instructions may be code generated to allow the game server 100 to function in a specific way and may be stored in the memory usable or readable by a computer. The instructions may execute the processes described in the present disclosure.

And the processor 120 may include hardware configuration of MPU (Micro Processing Unit) or CPU (Central Processing Unit), cache memory, data bus, etc. Additionally, any OS (operating system) and software configuration of applications that achieve specific purposes may further be included.

Also, the game server 100 may be connected with multiple player terminals 200 to provide players with the game of conquer by transmitting and receiving game data. Herein, the player terminals 200 may be digital devices capable of connecting and communicating with the game server 100. And the player terminals 200 may include any digital devices with processors capable of computation and having memories, such as a desktop computer, a notebook computer, a workstation, a PDA, a web pad, a mobile phone, etc.

Meanwhile, the game of conquer of buildings using the GPS based on the actual maps is a game in which a plurality of game players compete for conquering one or more virtual buildings located in one or more virtual regions on one or more virtual maps corresponding to one or more actual buildings located in one or more actual regions on one or more actual maps. To this end, the game server 100 may obtain and manage actual map data and may construct and manage virtual map data mapped from the actual map data. Herein, the actual map data and the virtual map data may be mapped at 1:1 ratio and managed, but the present disclosure is not limited thereto. For example, a separate process of determining a candidate group of buildings to be selected among the actual map data to become targets of conquering on the virtual map data may exist, and in this case, the virtual map data may be managed by only mapping those buildings selected into the candidate group. This process of determining the candidate group may select at least some buildings meeting certain criteria by referring to the actual map data or related building data, wherein the buildings meeting the certain criteria may include buildings with building prices above a preset building price, buildings with building site areas above a preset site area, buildings with heights above a preset height, and buildings requested to be registered in the virtual map data. However, the present disclosure may not be limited thereto.

In the present disclosure, a state at which the game players logged into the game of conquer are in an action of searching for a specific virtual building to visit for a siege battle is referred to as a first state, and a state at which the siege battle is in progress against the specific virtual building is referred to as a second state. In other words, the first state may be a state in which the game players are logged into the game by entering their IDs and passwords but are yet to start the siege battle, while the second state may be a state in which the game players are engaged in the siege battle by using their plurality of characters.

Figure 2:
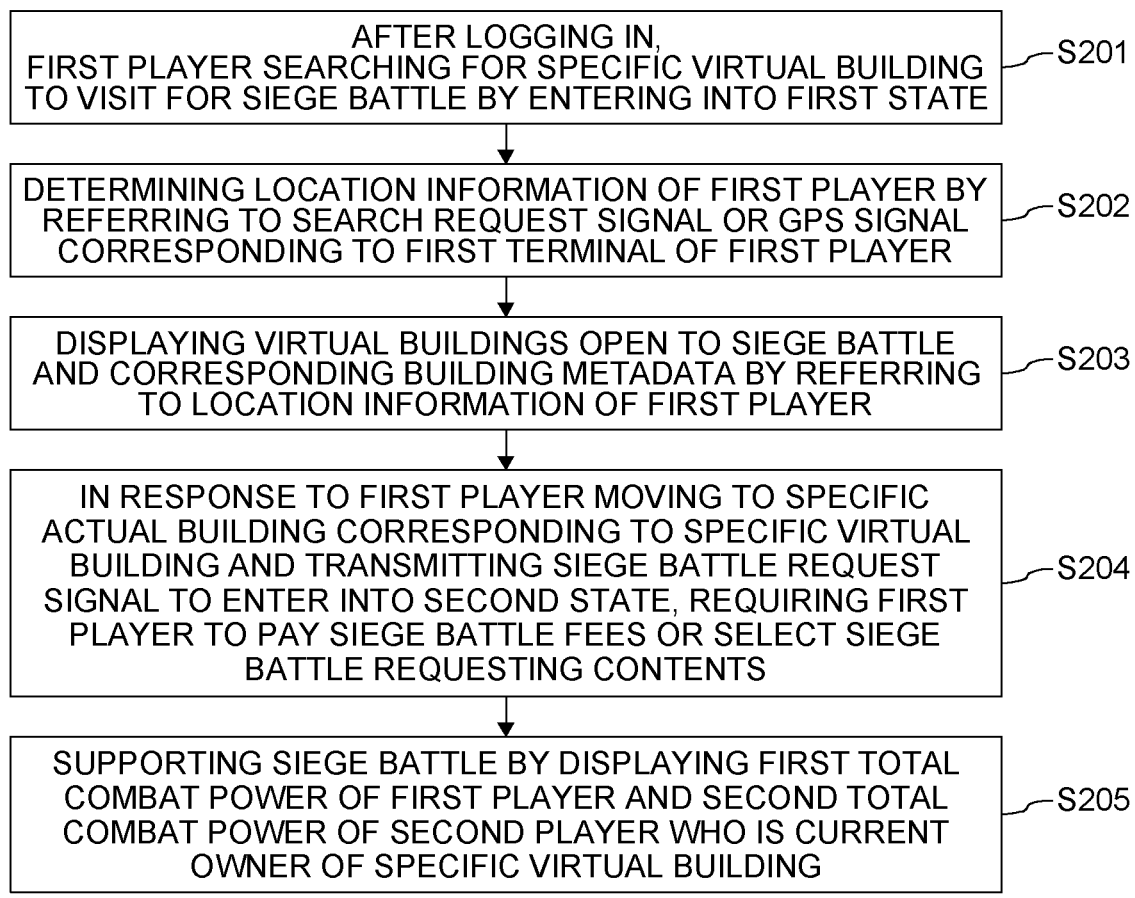
FIG. 2 is a drawing schematically illustrating a process of providing the game of conquer of buildings by using the GPS (Global Positioning System) based on an actual map in accordance with one example embodiment of the present disclosure.

FIG. 2 is a drawing schematically illustrating a process of providing the game of conquer of buildings by using the GPS based on the actual maps in accordance with one example embodiment of the present disclosure. That is, FIG. 2 schematically describes a series of processes whereby the first player searches for the specific virtual building for which the first player wishes to carry out the siege battle and visits the specific virtual building to request for the siege battle and whereby the siege battle between the first player requested for the siege battle and the second player currently occupying the specific virtual building is subsequently carried out.

By referring to FIG. 2, in response to detecting that the first player has logged into the game of conquer through accessing the game server 100 and entered into the first state of searching for the specific virtual building to visit at a step of S201, the game server 100 in accordance with one example embodiment of the present disclosure may perform a process of determining location information of the first player in a virtual space by referring to a search request signal or a GPS signal corresponding to a first terminal of the first player at a step of S202. Herein, the GPS signal may include actual location information of the first terminal, and the search request signal may include location information on a place where the first player wishes to play the game of conquer.

Herein, if the location information of the first player is determined as not included in location information history of the first player, the game server 100 may perform or support another device to perform processes of displaying one or more new region visiting contents corresponding to the location information of the first player on the first terminal of the first player, and providing one or more predetermined rewards corresponding to the new region visiting contents to the first player in a form of game cash. Herein, the new region visiting contents may include, but is not limited to, information on new regions where the first player wishes to play the game of conquer, contents on buildings, restaurants and specialties of the new regions, and various types of advertisements and surveys targeting visitors, etc.

Subsequently, once the location information of the first player is determined, the game server 100 may perform a process of displaying one or more virtual buildings, available for conquering through the siege battle by the first player, on the virtual map corresponding to the virtual space by referring to the location information of the first player at a step of S203.

Figure 3:
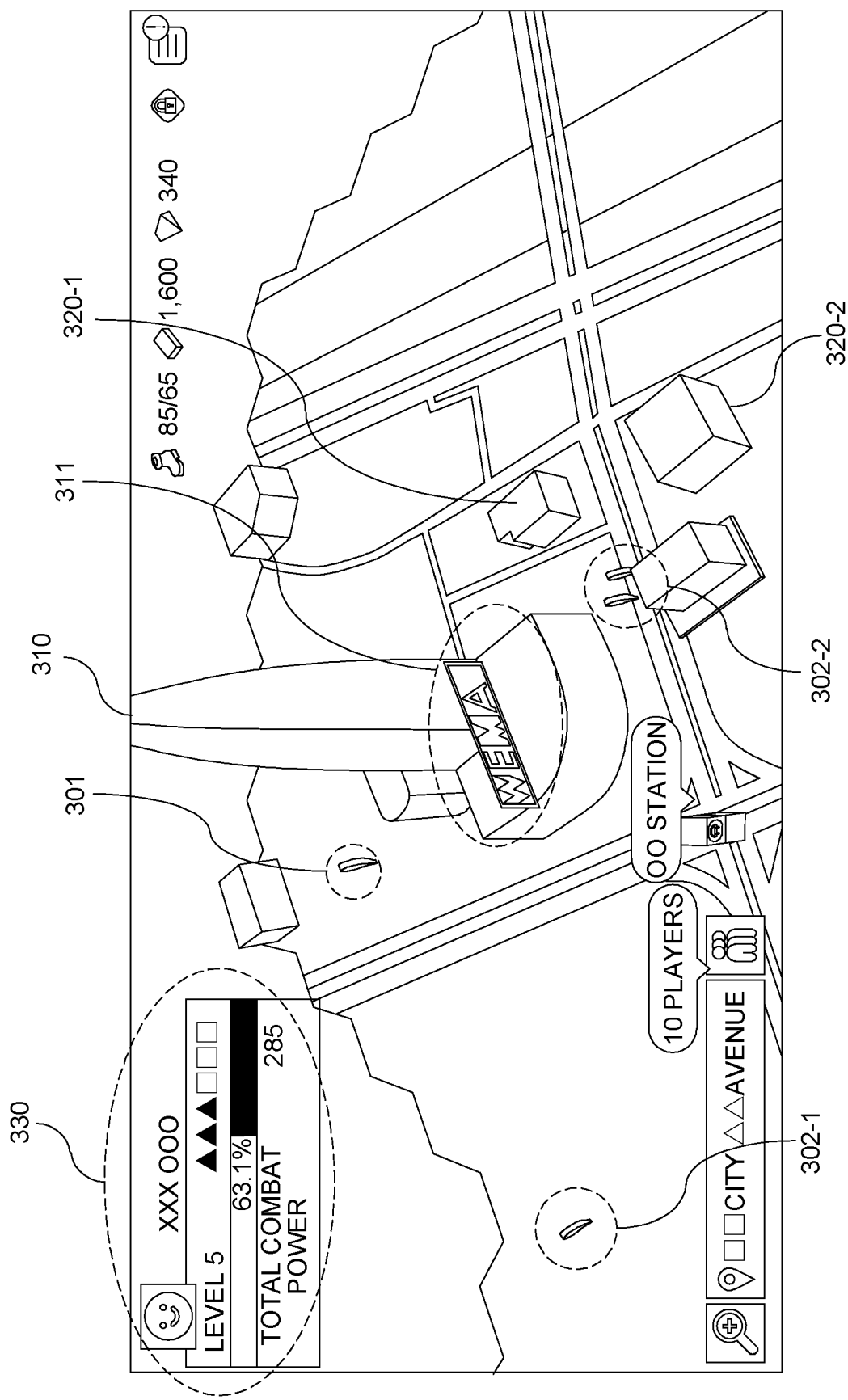
FIG. 3 is a drawing schematically illustrating a game screen displaying conquerable virtual buildings, locations of a plurality of players and player information, etc., on a virtual map constructed based on the actual maps in accordance with one example embodiment of the present disclosure.

Herein, by referring to FIG. 3 which is schematically illustrating a game screen displaying a virtual map constructed based on an actual map in accordance with one example embodiment of the present disclosure, information such as the location information of the first player 301, location information of a plurality of players 302-1, 302-2, etc. playing nearby the location information of the first player, a plurality of virtual buildings 310, 320-1, 320-2, etc. available for conquering, a signboard 311 of the virtual buildings, first player information 330 and the like may be displayed on the virtual map. Herein, depending on implementation conditions of the present disclosure, forms, types and locations of the various information displayed on the virtual map may vary as the case may be.

Figure 4:
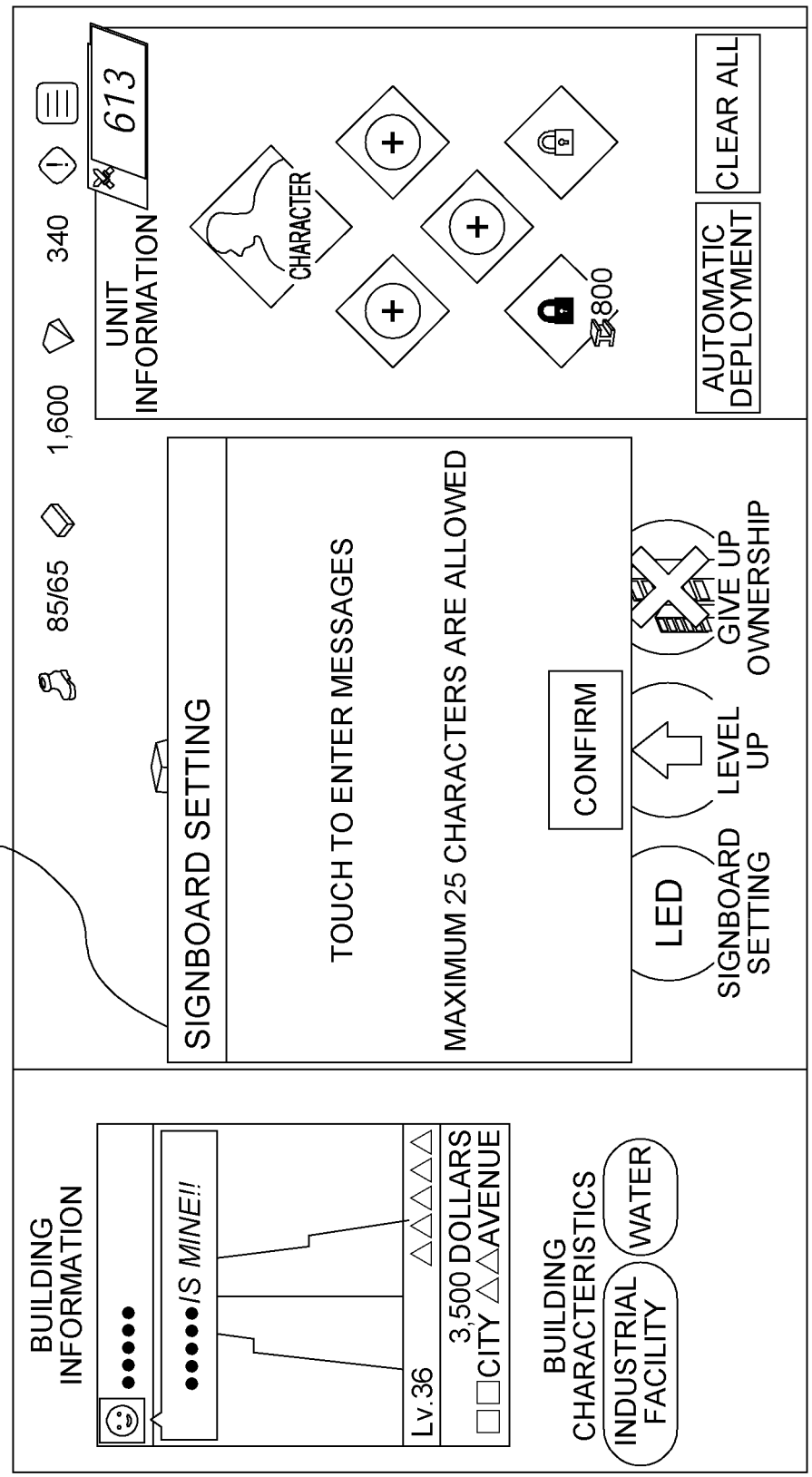
FIG. 4 is a drawing schematically illustrating a game screen displaying a user interface provided to current owners of virtual buildings to allow the current owners to add message contents to signboards placed on the virtual buildings in accordance with one example embodiment of the present disclosure.

Also, by referring to FIG. 4, the game server 100 may perform or support another device to perform processes of (i) providing a user interface 401 that allows a current owner occupying the specific virtual building to display message contents on a signboard placed on the specific virtual building, and (ii) in response to a specific message content being entered through the user interface 401, supporting a display of the specific message content on the signboard placed on the specific virtual building through a screen of a terminal of another user approaching the specific virtual building at the first state.

In addition, given that the virtual map has been displayed as demonstrated above, in order to provide information helpful for the first player to determine whether to carry out the siege battle against the specific virtual building, at least part of building metadata including at least part of building level data, building characteristics data, game cash acquisition rate data, item production rate data, and character buff-rate data corresponding to the specific virtual building and combat power data of a defense unit deployed by the current owner of the specific virtual building may be displayed when the specific virtual building on the virtual map is selected by the first player.

Additionally, by referring to the building metadata, the game server 100 may perform or support another device to perform processes of (i) increasing combat power of at least one character owned by the current owner of the specific virtual building at a certain rate according to the character buff-rate data corresponding to the specific virtual building, (ii) providing a certain amount of building reinforcement items every certain time interval according to the item production rate data corresponding to the specific virtual building, and (iii) providing a certain portion of game profits generated from the siege battle fees or from the siege battle requesting contents to the current owner of the specific virtual building as the game cash according to the game cash acquisition rate data corresponding to the specific virtual building. Herein, the building reinforcement items are allowed to be used by the current owner of the specific virtual building to improve the specific building level of the specific virtual building.

Furthermore, the game server 100 may perform or support another device to perform processes of (i) classifying the virtual buildings into landmarks 310, etc. and general buildings 320-1, 320-2, etc. by referring to building metadata of the virtual buildings located in the virtual regions on the virtual maps corresponding to the actual buildings located in the actual regions on the actual maps, wherein the building metadata includes at least part of the building level data, the building characteristics data, the game cash acquisition rate data, the item production rate data, and the character buff-rate data corresponding to the virtual buildings, and (ii) assigning higher numerical values to at least part of first character buff-rate data, first item production rate data and first game cash acquisition rate data of the landmarks 310 etc., as compared to at least part of second character buff-rate data, second item production rate data and second game cash acquisition rate data of the general buildings 320-1, 320-2, etc. Accordingly, first difficulty levels of siege and defense of the landmarks 310, etc. may be higher than second difficulty levels of siege and defense of the general buildings 320-1, 320-2, etc. and competitions for sieging buildings of higher difficulty levels may be encouraged among the game players by giving differences to graphical appearances of the landmarks 310, etc. compared with graphical appearances of the general buildings 320-1, 320-2, etc., but the present disclosure is not limited thereto.

By referring to FIG. 2 again, during the first state, in response to the first player moving to a specific actual region where a specific actual building corresponding to the specific virtual building is located and transmitting a siege battle request signal for initiating the siege battle against the specific virtual building, the game server 100 may perform a process of requesting at least part of payment action or selection action from the first player at a step of S204, wherein the payment action of the first player is performed by allowing siege battle fees for entering the second state to be paid and wherein the selection action of the first player is performed by allowing one or more siege battle requesting contents to be selected. Herein, the siege battle requesting contents may include, but is not limited to, contents on the specific actual building whose siege battle of its corresponding specific virtual building is requested, contents on the specific actual region where the specific actual building is located, and various types of advertisements and surveys targeting the first player, etc.

In detail, the game server 100 may perform or support another device to perform processes of forming the siege battle requesting contents by referring to at least part of data from (i) specific building data including at least part of information on a location of the specific actual building, store brands in the specific actual building, owners of the specific actual building, surrounding commercial districts, and users who visit the specific actual building corresponding to the specific virtual building, (ii) specific regional data including at least part of information on a location of the specific actual region, region visitors who visit the specific actual region, tourist sites near the specific actual region, surrounding commercial districts of the specific actual region in which the specific actual building is located, and (iii) specific correlation data representing correlation between the specific building data and the specific regional data.

Also, the game server 100 may perform or support another device to perform processes of selecting one profit distribution algorithm from a first profit distribution algorithm and a second profit distribution algorithm to thereby perform profit distribution to the current owner of the specific virtual building, wherein the first profit distribution algorithm provides a first portion of building profits, which is at least part of the game profits generated from the siege battle fees or from the siege battle requesting contents belonging to the specific virtual building, to the current owner of the specific virtual building as the game cash, according to a first game cash acquisition rate data corresponding to the current owner of the specific virtual building, and wherein the second profit algorithm provides a second portion of regional profits, which is at least part of the game profits generated from the siege battle fees or from the siege battle requesting contents belonging to a specific virtual region having a plurality of the virtual buildings including the specific virtual building, to the current owner of the specific virtual building, as the game cash according to a second game cash acquisition rate data corresponding to the current owner of the specific virtual building.

In addition, the game server 100 may perform or support another device to perform processes of increasing the game cash acquisition rate data by referring to a duration for which the current owner has been occupying the specific virtual building (continuous occupancy duration or accumulated occupancy duration), to thereby acquire an increased game cash acquisition rate data, and providing a some portion of the game profits generated form the siege battle fees or from the siege battle requesting contents as the game cash according to the increased game cash acquisition rate data. In other words, since a game cash acquisition rate of the specific virtual building owned by the current owner increases over time, this may encourage those game players defending their buildings to carry out building reinforcements or defense unit reinforcements that may help to increase their period of occupancy of their buildings.

By referring to FIG. 2 again, in response to detecting that the first player has entered the second state by paying the siege battle fees or selecting the siege battle requesting contents, the game server 100 may perform or support another device to perform processes of (i) displaying at least one character among a (1_1)-st character to a (1_n)-th character owned by the first player and at least one character among a (2_1)-st character to a (2_m)-th character owned by the second player corresponding to the current owner of the specific virtual building, (ii) displaying a first total combat power computed by referring to at least part of level combat power, machine combat power, skill combat power of each of a (1_1)-st participating character to a (1_i)-th participating character selected by the first player to participate in the siege battle, wherein "i" is an integer selected from integers of 1 to n, and (iii) displaying a second total combat power computed by referring to building defense power corresponding to a specific building level of the specific virtual building owned by the second player and by referring to at least part of level combat power, machine combat power, skill combat power of each of a (2_1)-st participating character to a (2_j)-th participating character selected by the second player to participate in the siege battle, wherein "j" is an integer selected from integers of 1 to m, to thereby support the siege battle between the first player and the second player to proceed at a step of S205.

Figure 5:
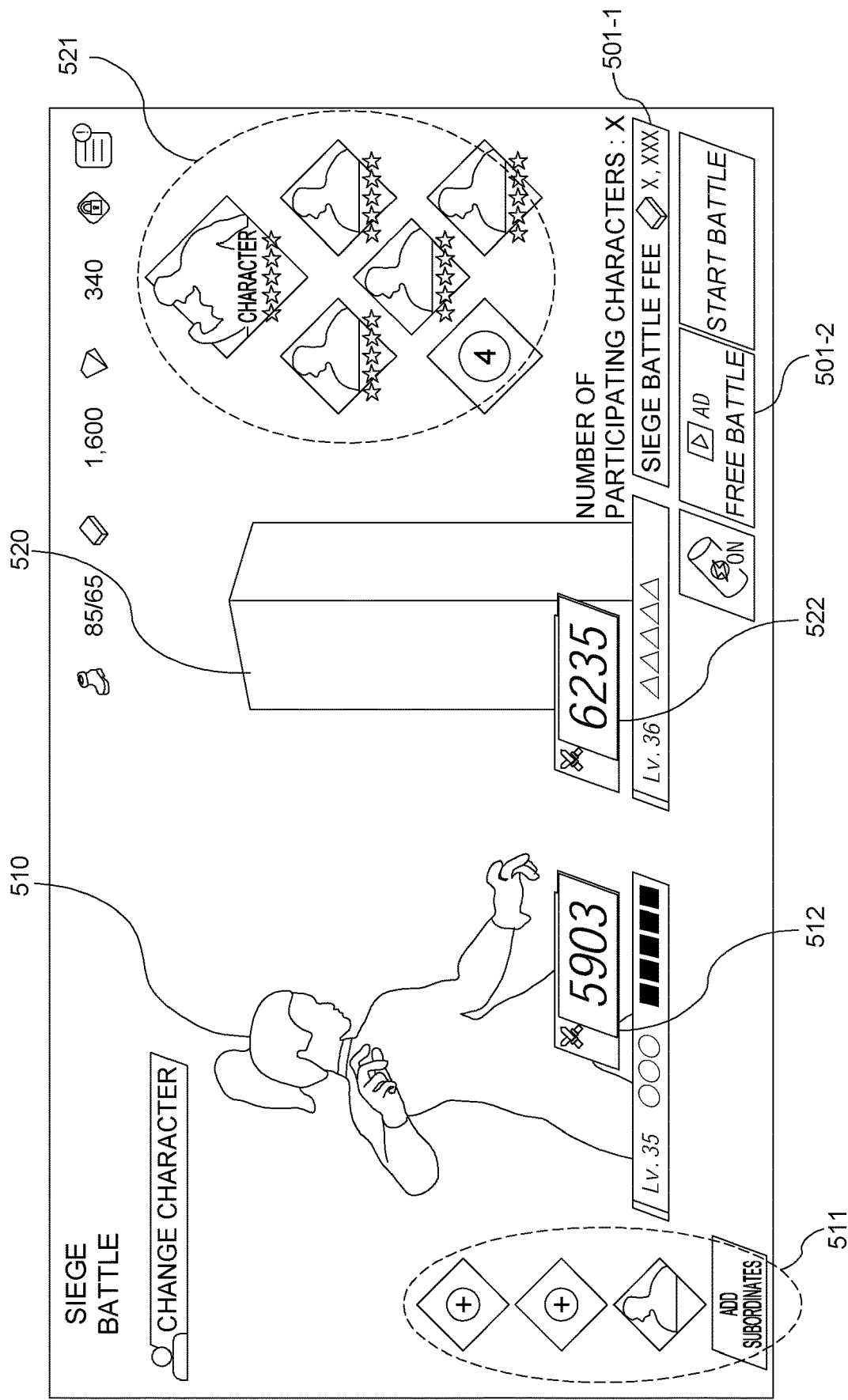
FIG. 5 is a drawing schematically illustrating a game screen displaying combat powers of the players participating in a siege battle, building defense powers and siege battle fees, etc., for a virtual building whose siege battle request signal is received in accordance with one example embodiment of the present disclosure.

By referring to FIG. 5 which is schematically illustrating a game screen displaying combat powers of the players participating in the siege battle, building defense powers and the siege battle fees, etc., in accordance with one example embodiment of the present disclosure, the game server 100 may provide the first player 510 who requested the siege battle with an option to select a siege battle fees tab 501-1 or a siege battle requesting contents tab 501-2 to enter the second state. Further, the game server 100 may provide the first player 510 with an attack unit listing function 511 to select the (1_1)-st participating character to the (1_i)-th participating character from the (1_1)-st character to the (1_n)-th character to participate in the siege battle, and may display the first total combat power 512 computed by referring to at least part of the level combat power, the machine combat power, the skill combat power of each of the (1_1)-st participating character to the (1_i)-th participating character.

Also, by referring to FIG. 5, the game server 100 may display the (2_1)-st participating character to the (2_j)-th participating character, selected by the second player 520 from the (2_1)-st character to the (2_m)-th character, by using a defense unit listing function 521, and may display the second total combat power 522 computed by referring to the building defense power corresponding to the specific building level of the specific virtual building owned by the second player and by referring to at least part of the level combat power, the machine combat power, the skill combat power of each of the (2_1)-st participating character to the (2_j)-th participating character. The screen graphic display of FIG. 5 is provided as an example of the present disclosure for reference, and depending on implementation conditions of the present disclosure, forms, types and locations of the various information displayed on the screen may vary as the case may be.

Herein, the game server 100 may perform or support another device to perform processes of allowing the second player to select the (2_1)-st participating character to the (2_j)-th participating character from the (2_1)-st character to the (2_m)-th character as a regular defense unit, and allowing the second player to increase a size of the regular defense unit by paying predetermined amounts of the building reinforcement items having predetermined types. Herein, the regular defense unit may be allowed to participate in the siege battle regardless of whether the second player is logged in or not.

Also, when computing the first total combat power and the second total combat power, the game server may additionally refer to elements such as the building characteristics data and character properties data, etc. For example, on condition that the building characteristics data and the character properties data have been classified into a first type to a z type and on condition that incompatible type pairs and superiorities between the first type to the z type have been set, the game server 100 may perform or support another device to perform processes of (i) comparing (1_1)-st character properties data to (1_i)-th character properties data with at least part of specific building characteristics data and (2_1)-st character properties data to (2_j)-th character properties data, wherein the (1_1)-st character properties data to the (1_i)-th character properties data correspond to the (1_1)-st participating character to the (1-i)-th participating character of the first player, wherein the specific building characteristics data correspond to the specific virtual building and wherein the (2_1)-st character properties data to the (2_j)-th character properties data correspond to the (2_1)-st participating character to the (2-j)-th participating character of the second player and thus (ii) allowing attack power advantages to at least part of the (1_1)-st participating character to the (1-i)-th participating character in case at least part of the (1_1)-st character properties data to the (1-i)-th character properties data are determined as having superiorities to at least part of the specific building characteristics data and the (2_1)-st character properties data to the (2_j)-th character properties data, and (iii) allowing defense power advantages to at least part of the specific building and the (2_1)-st participating character to the (2_j)-th participating character in case at least part of the specific building characteristics data and the (2_1)-st character properties data to the (2_j)-th character properties data are determined as having superiorities to at least part of the (1_1)-st character properties data to the (1-i)-th character properties data.

Next, in response to detecting that an outcome on a victory or a defeat of the first player and the second player has been determined according to the first total combat power and the second total combat power, the game server 100 may provide different rewards and penalties to the first player and the second player according to the outcome.

For example, in case the first player is determined as a winner of the siege battle, the game server 100 may perform or support another device to perform processes of (i) determining whether to perform a first adjustment on the specific building level of the specific virtual building, (ii) transferring ownership data of the specific virtual building from the second player to the first player, (iii) providing at least part of the building reinforcement items and level upgrades for at least one of the (1_1)-st character to the (1_n)-th character owned by the first player, as siege success rewards to the first player, and (iv) applying level downgrades to at least one of the (2_1)-st character to the (2_m)-th character owned by the second player, as defense failure penalties to the second player.

As another example, in case the second player is determined as the winner of the siege battle, the game server 100 may perform or support another device to perform processes of (i) determining whether to perform a second adjustment on the specific building level of the specific virtual building, (ii) maintaining the ownership data of the specific virtual building as the second player, (iii) applying the level downgrades to at least one of the (1_1)-st character to the (1_n)-th character owned by the first player, as siege failure penalties to the first player, and (iv) providing at least part of the building reinforcement items and the level upgrades for at least one of the (2_1)-st character to the (2_m)-th character owned by the second player, as defense success rewards to the second player. Herein, the first adjustment and the second adjustment on the specific building level may be applied by deducting, increasing or retaining the specific building level, but the present disclosure is not limited thereto.

Figure 6:
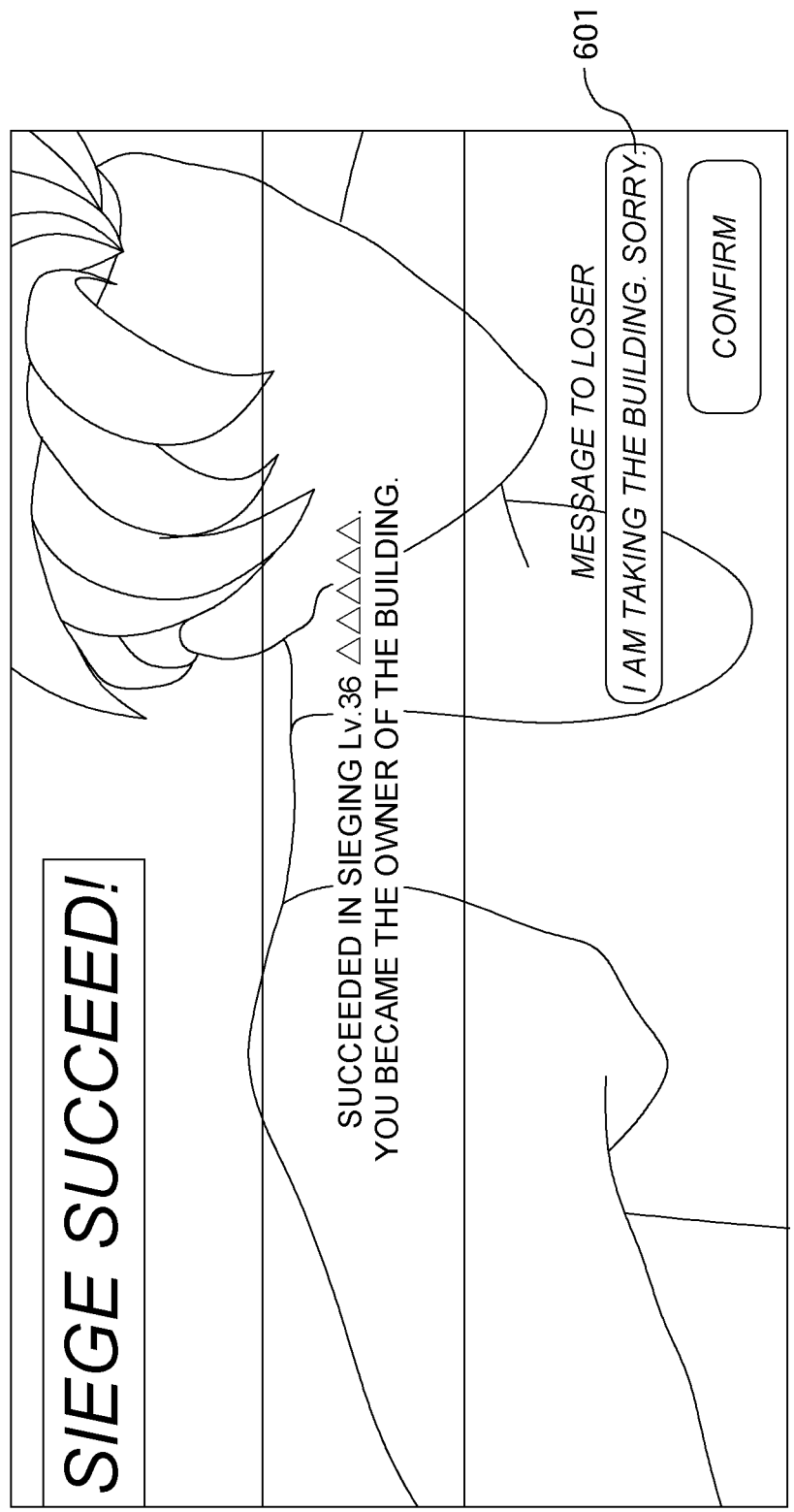
FIG. 6 is a drawing schematically illustrating a game screen displayed upon a completion of the siege battle to display a winner of the siege battle and a message content window, etc., in accordance with one example embodiment of the present disclosure.

FIG. 6 is schematically illustrating a game screen displayed upon a completion of the siege battle to display the winner of the siege battle and a message content window, etc., in accordance with one example embodiment of the present disclosure. By referring to FIG. 6, the game server 100 may display the winner of the siege battle, an announcement on winning or losing of the game players and an announcement on shift or retention of ownership of the specific virtual building, along with an option tab 601 to send a message to a lost player of the siege battle. The screen graphic display of FIG. 6 on the outcome of the siege battle is provided as an example of the present disclosure for reference, and depending on implementation conditions of the present disclosure, forms, types and locations of the various information displayed on the screen may vary as the case may be.

Meanwhile, by referring to FIG. 7 which is schematically illustrating a game screen displaying information on the specific virtual building owned by the current owner to aid the current owner to reinforce the specific virtual building in accordance with one example embodiment of the present disclosure, the game server 100 may provide a level-up option 711 for reinforcing building levels, a unit build-up option 712 for increasing the number of participating characters for the regular defense unit, etc., as possible options for the building reinforcements to the current owner of the specific virtual building 710.

Herein, in response to detecting that (i) the current owner occupying the specific virtual building has collected game cash for performing the building reinforcements, (ii) the current owner has collected one or more building reinforcement items for performing the building reinforcements, and (iii) building reinforcement waiting time corresponding to a specific building level of the specific virtual building has been passed, the game server 100 may perform or support another device to perform processes of allowing the current owner to perform the building reinforcements on the specific virtual building and thus allowing the building defense power to be increased through the building reinforcements.

Also, the game server 100 may perform or support another device to perform processes of allowing the current owner to shorten the building reinforcement waiting time by using one or more waiting time shortening contents, wherein the waiting time shortening contents may be selected by referring to at least part of the specific building data of the specific actual building corresponding to the specific virtual building, the specific regional data of the specific actual region in which the specific actual building is located, and the specific correlation data representing correlation between the specific building data and the specific regional data. Herein, the waiting time shortening contents may include, but is not limited to, contents on the specific actual building corresponding to the specific virtual building owned by the current owner, contents on the specific actual region where the specific actual building is located, and various types of advertisements and surveys targeting the current owner, etc.

In addition, by providing the game screen as described in FIG. 7, the game server 100 may provide additional information, such as the building characteristics data 713 or building state data 714 representing sturdiness of the specific virtual building, to the current owner of the specific virtual building such that this additional information may be taken into consideration when establishing a defense strategy. At the same time, the game server 100 may provide functions such as a signboard setting option 715 for changing the message contents shown on the signboard to allow the current owner to manage the specific virtual building. However, the screen graphic display of FIG. 7 is provided as an example of the present disclosure for reference, and depending on implementation conditions of the present disclosure, forms, types and locations of the various information displayed on the screen may vary as the case may be.

The present disclosure has an effect of providing the game of conquering buildings, using the GPS (Global Positioning System) based on the actual maps, which motivates the game players to visit various places as well as provides a variety of game manipulation elements and strategic components such as character reinforcements and building reinforcements to the game players.

The present disclosure has another effect of providing the games players with a diversity of contents related to actual buildings and actual regions corresponding to the virtual buildings and the virtual regions existing in the game of conquering buildings such that local communities are promoted to the game players visiting actual places.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a game of conquer of buildings by using a global positioning system (GPS) based on a real map, wherein the game of conquer is a game in which a plurality of game players, including at least one first player and at least one second player, compete for conquering one or more virtual buildings located in one or more virtual regions on one or more virtual maps corresponding to one or more actual buildings located in one or more actual regions on one or more actual maps, wherein a first state of the game of conquer represents a state in which the game players who have logged into the game of conquer are in an action of searching for a specific virtual building to visit and wherein a second state of the game of conquer represents a state in which a siege battle is in progress against the specific virtual building, comprising steps of:

(a) a game server, during the first state, performing or supporting another device to perform processes of (i) determining location information of the first player in a virtual space by referring to a search request signal or a GPS signal corresponding to a first terminal of the first player, (ii) displaying one or more virtual buildings, available for conquering through the siege battle by the first player, on the virtual maps corresponding to the virtual space by referring to the location information of the first player, and (iii) in response to the specific virtual building on the virtual maps being selected, displaying at least part of combat power data of a defense unit deployed by a current owner of the specific virtual building and building metadata including at least part of building level data, building characteristics data, game cash acquisition rate data, item production rate data, and character buff-rate data corresponding to the specific virtual building;

(b) during the first state, in response to the first player moving to a specific actual region where a specific actual building corresponding to the specific virtual building is located and transmitting a siege battle request signal for initiating the siege battle against the specific virtual building, the game server performing or supporting another device to perform a process of requesting at least part of payment action or selection action from the first player, wherein the payment action of the first player is performed by allowing siege battle fees for entering the second state to be paid and wherein the selection action of the first player is performed by allowing one or more siege battle requesting contents to be selected; and (c) in response to the first player entering the second state, the game server performing or supporting another device to perform processes of (i) displaying at least one character among a (1_1)-st character to a (1_n)-th character owned by the first player and at least one character among a (2_1)-st character to a (2_m)-th character owned by the second player corresponding to the current owner of the specific virtual building, (ii) displaying a first total combat power computed by referring to at least part of level combat power, machine combat power, skill combat power of each of a (1_1)-st participating character to a (1_i)-th participating character selected by the first player to participate in the siege battle, wherein "i" is an integer selected from integers of 1 to n, and (iii) displaying a second total combat power computed by referring to building defense power corresponding to a specific building level of the specific virtual building owned by the second player and by referring to at least part of level combat power, machine combat power, skill combat power of each of a (2_1)-st participating character to a (2_j)-th participating character selected by the second player to participate in the siege battle, wherein "j" is an integer selected from integers of 1 to m, to thereby support the siege battle between the first player and the second player to proceed.

2. The method of claim 1, wherein, after the step of (c), in response to detecting that an outcome on a victory or a defeat of the first player and the second player has been determined according to the first total combat power and the second total combat power, (i) in case the first player is determined as a winner of the siege battle, the game server performs or supports another device to perform processes of:

(i-1) determining whether to perform a first adjustment on the specific building level of the specific virtual building;
(i-2) transferring ownership data of the specific virtual building from the second player to the first player;
(i-3) providing at least part of building reinforcement items and level upgrades for at least one of the (1_1)-st character to the (1_n)-th character owned by the first player, as siege success rewards to the first player; and
(i-4) applying level downgrades to at least one of the (2_1)-st character to the (2_m)-th character owned by the second player, as defense failure penalties to the second player, and (ii) in case the second player is determined as the winner of the siege battle, the game server performs or supports another device to perform processes of:
(ii-1) determining whether to perform a second adjustment on the specific building level of the specific virtual building;
(ii-2) maintaining the ownership data of the specific virtual building as the second player;
(ii-3) applying the level downgrades to at least one of the (1_1)-st character to the (1_n)-th character owned by the first player, as siege failure penalties to the first player; and
(ii-4) providing at least part of the building reinforcement items and the level upgrades for at least one of the (2_1)-st character to the (2_m)-th character owned by the second player, as defense success rewards to the second player.

3. The method of claim 1, wherein, by referring to the building metadata, the game server performs or supports another device to perform processes of:
(i) increasing combat power of at least one character owned by the current owner of the specific virtual building at a certain rate according to the character buff-rate data corresponding to the specific virtual building;
(ii) providing a certain amount of building reinforcement items every certain time interval according to the item production rate data corresponding to the specific virtual building, wherein the building reinforcement items are allowed to be used by the current owner of the specific virtual building to improve the specific building level of the specific virtual building; and
(iii) providing a certain portion of game profits generated from the siege battle fees or from the siege battle requesting contents to the current owner of the specific virtual building as game cash according to the game cash acquisition rate data corresponding to the specific virtual building.

4. The method of claim 3, wherein the game server performs or supports another device to perform processes of increasing the game cash acquisition rate data by referring to a duration for which the current owner has been occupying the specific virtual building, to thereby acquire an increased game cash acquisition rate data, and providing the certain portion of the game profits generated form the siege battle fees or from the siege battle requesting contents as the game cash according to the increased game cash acquisition rate data.

5. The method of claim 3, wherein the game server performs or supports another device to perform a process of selecting one profit distribution algorithm from a first profit distribution algorithm and a second profit distribution algorithm to thereby perform profit distribution to the current owner of the specific virtual building, wherein the first profit distribution algorithm provides a first portion of building profits, which is at least part of the game profits generated from the siege battle fees or from the siege battle requesting contents belonging to the specific virtual building, to the current owner of the specific virtual building as the game cash, according to a first game cash acquisition rate data corresponding to the current owner of the specific virtual building, and wherein the second profit algorithm provides a second portion of regional profits, which is at least part of the game profits generated from the siege battle fees or from the siege battle requesting contents belonging to a specific virtual region having a plurality of the virtual buildings including the specific virtual building, to the current owner of the specific virtual building, as the game cash according to a second game cash acquisition rate data corresponding to the current owner of the specific virtual building.

6. The method of claim 1, wherein the game server performs or supports another device to perform a process of forming the siege battle requesting contents by referring to at least part of data from:
(i) specific building data including at least part of information on a location of the specific actual building, store brands in the specific actual building, owners of the specific actual building, surrounding commercial districts, and users who visit the specific actual building corresponding to the specific virtual building;
(ii) specific regional data including at least part of information on a location of the specific actual region, region visitors who visit the specific actual region, tourist sites near the specific actual region, surrounding commercial districts of the specific actual region in which the specific actual building is located; and
(iii) specific correlation data representing correlation between the specific building data and the specific regional data.

7. The method of claim 1, wherein, before the step of (a), the game server performs or supports another device to perform processes of:
(i) classifying the virtual buildings into landmarks and general buildings by referring to building metadata of the virtual buildings located in the virtual regions on the virtual maps corresponding to the actual buildings located in the actual regions on the actual maps, wherein the building metadata includes at least part of the building level data, the building characteristics data, the game cash acquisition rate data, the item production rate data, and the character buff-rate data corresponding to the virtual buildings; and
(ii) assigning higher numerical values to at least part of first character buff-rate data, first item production rate data and first game cash acquisition rate data of the landmarks as compared to at least part of second character buff-rate data, second item production rate data and second game cash acquisition rate data of the general buildings.

8. The method of claim 1, wherein the game server performs or supports another device to perform processes of:
(i) providing a user interface that allows the current owner occupying the specific virtual building to display message contents on a signboard placed on the specific virtual building; and
(ii) in response to a specific message content being entered through the user interface, supporting a display of the specific message content on the signboard placed on the specific virtual building through a screen of a terminal of another user approaching the specific virtual building at the first state.

9. The method of claim 1, wherein, on condition that the building characteristics data and character properties data have been classified into a first type to a z type and on condition that incompatible type pairs and superiorities between the first type to the z type have been set, the game server performs or supports another device to perform processes of:
  (i) comparing (1_1)-st character properties data to (1_i)-th character properties data with at least part of specific building characteristics data and (2_1)-st character properties data to (2_j)-th character properties data, wherein the (1_1)-st character properties data to the (1_i)-th character properties data correspond to the (1_1)-st participating character to the (1-i)-th participating character of the first player, wherein the specific building characteristics data correspond to the specific virtual building and wherein the (2_1)-st character properties data to the (2_j)-th character properties data correspond to the (2_1)-st participating character to the (2-j)-th participating character of the second player; and thus
  (ii) allowing attack power advantages to at least part of the (1_1)-st participating character to the (1-i)-th participating character in case at least part of the (1_1)-st character properties data to the (1-i)-th character properties data are determined as having superiorities to at least part of the specific building characteristics data and the (2_1)-st character properties data to the (2_j)-th character properties data; and
  (iii) allowing defense power advantages to at least part of the specific building and the (2_1)-st participating character to the (2_j)-th participating character in case at least part of the specific building characteristics data and the (2_1)-st character properties data to the (2_j)-th character properties data are determined as having superiorities to at least part of the (1_1)-st character properties data to the (1-i)-th character properties data.

10. The method of claim 1, wherein, in response to detecting that (i) the current owner occupying the specific virtual building has collected game cash for performing building reinforcements, (ii) the current owner has collected one or more building reinforcement items for performing the building reinforcements, and (iii) building reinforcement waiting time corresponding to a specific building level of the specific virtual building has been passed, the game server performs or supports another device to perform processes of allowing the current owner to perform the building reinforcements on the specific virtual building and thus allowing the building defense power to be increased through the building reinforcements.

11. The method of claim 10, wherein the game server performs or supports another device to perform a process of allowing the current owner to shorten the building reinforcement waiting time by using one or more waiting time shortening contents, wherein the waiting time shortening contents are selected by referring to at least part of specific building data of the specific actual building corresponding to the specific virtual building, specific regional data of the specific actual region in which the specific actual building is located, and specific correlation data representing correlation between the specific building data and the specific regional data.

12. The method of claim 1, wherein, at the step of (a), if the location information of the first player is determined as not included in location information history of the first player, the game server performs or supports another device to perform processes of displaying one or more new region visiting contents corresponding to the location information of the first player on the first terminal of the first player, and providing one or more predetermined rewards corresponding to the new region visiting contents to the first player in a form of game cash.

13. The method of claim 1, wherein, at the step of (c), the game server performs or supports another device to perform processes of allowing the second player to select the (2_1)-st participating character to the (2_j)-th participating character from the (2_1)-st character to the (2_m)-th character as a regular defense unit that is allowed to participate in the siege battle regardless of whether the second player is logged in or not, and allowing the second player to increase a size of the regular defense unit by paying predetermined amounts of building reinforcement items having predetermined types.

14. A game server for providing a game of conquer of buildings by using a global positioning system (GPS) based on a real map, wherein the game of conquer is a game in which a plurality of game players, including at least one first player and at least one second player, compete for conquering one or more virtual buildings located in one or more virtual regions on one or more virtual maps corresponding to one or more actual buildings located in one or more actual regions on one or more actual maps, wherein a first state of the game of conquer represents a state in which the game players who have logged into the game of conquer are in an action of searching for a specific virtual building to visit and wherein a second state of the game of conquer represents a state in which a siege battle is in progress against the specific virtual building, comprising:
  at least one memory that stores instructions; and
  at least one processor configured to execute the instructions to perform or support another device to perform:
    (I) during the first state, processes of (i) determining location information of the first player in a virtual space by referring to a search request signal or a GPS signal corresponding to a first terminal of the first player, (ii) displaying one or more virtual buildings, available for conquering through the siege battle by the first player, on the virtual maps corresponding to the virtual space by referring to the location information of the first player, and (iii) in response to the specific virtual building on the virtual maps being selected, displaying at least part of combat power data of a defense unit deployed by a current owner of the specific virtual building and building metadata including at least part of building level data, building characteristics data, game cash acquisition rate data, item production rate data, and character buff-rate data corresponding to the specific virtual building;
    (II) during the first state, in response to the first player moving to a specific actual region where a specific actual building corresponding to the specific virtual building is located and transmitting a siege battle request signal for initiating the siege battle against the specific virtual building, a process of requesting at least part of payment action or selection action from the first player, wherein the payment action of the first player is performed by allowing siege battle fees for entering the second state to be paid and wherein the selection action of the first player is performed by allowing one or more siege battle requesting contents to be selected; and
    (III) in response to the first player entering the second state, processes of (i) displaying at least one character among a (1_1)-st character to a (1_n)-th character owned by the first player and at least one character among a (2_1)-st character to a (2_m)-th character owned by the second player corresponding to the current owner of the specific virtual building, (ii) displaying a first total combat power computed by referring to at least part of level combat power, machine combat power, skill combat power of each of a (1_1)-st participating character to a (1_i)-th participating character selected by the first player to participate in the siege battle, wherein "i" is an integer selected from integers of 1 to n, and (iii) displaying a second total combat power computed by referring to building defense power corresponding to a specific building level of the specific virtual building owned by the second player and by referring to at least part of level combat power, machine combat power, skill combat power of each of a (2_1)-st participating character to a (2_j)-th participating character selected by the second player to participate in the siege battle, wherein "j" is an integer selected from integers of 1 to m, to thereby support the siege battle between the first player and the second player to proceed.

15. The game server of claim 14, wherein, after the process of (III), in response to detecting that an outcome on a victory or a defeat of the first player and the second player has been determined according to the first total combat power and the second total combat power,
(i) in case the first player is determined as a winner of the siege battle, the processor performs or supports another device to perform processes of (i-1) determining whether to perform a first adjustment on the specific building level of the specific virtual building, (i-2) transferring ownership data of the specific virtual building from the second player to the first player, (i-3) providing at least part of building reinforcement items and level upgrades for at least one of the (1_1)-st character to the (1_n)-th character owned by the first player, as siege success rewards to the first player, and (i-4) applying level downgrades to at least one of the (2_1)-st character to the (2_m)-th character owned by the second player, as defense failure penalties to the second player; and
(ii) in case the second player is determined as the winner of the siege battle, the processor performs or supports another device to perform processes of (ii-1) determining whether to perform a second adjustment on the specific building level of the specific virtual building, (ii-2) maintaining the ownership data of the specific virtual building as the second player, (ii-3) applying the level downgrades to at least one of the (1_1)-st character to the (1_n)-th character owned by the first player, as siege failure penalties to the first player, and (ii-4) providing at least part of the building reinforcement items and the level upgrades for at least one of the (2_1)-st character to the (2_m)-th character owned by the second player, as defense success rewards to the second player.

16. The game server of claim 14, wherein, by referring to the building metadata, the processor performs or supports another device to perform processes of:
(i) increasing combat power of at least one character owned by the current owner of the specific virtual building at a certain rate according to the character buff-rate data corresponding to the specific virtual building;
(ii) providing a certain amount of building reinforcement items every certain time interval according to the item production rate data corresponding to the specific virtual building, wherein the building reinforcement items are allowed to be used by the current owner of the specific virtual building to improve the specific building level of the specific virtual building; and
(iii) providing a certain portion of game profits generated from the siege battle fees or from the siege battle requesting contents to the current owner of the specific virtual building as game cash according to the game cash acquisition rate data corresponding to the specific virtual building.

17. The game server of claim 16, wherein the processor performs or supports another device to perform processes of increasing the game cash acquisition rate data by referring to a duration for which the current owner has been occupying the specific virtual building, to thereby acquire an increased game cash acquisition rate data, and providing the certain portion of the game profits generated form the siege battle fees or from the siege battle requesting contents as the game cash according to the increased game cash acquisition rate data.

18. The game server of claim 16, wherein the processor performs or supports another device to perform a process of selecting one profit distribution algorithm from a first profit distribution algorithm and a second profit distribution algorithm to thereby perform profit distribution to the current owner of the specific virtual building, wherein the first profit distribution algorithm provides a first portion of building profits, which is at least part of the game profits generated from the siege battle fees or from the siege battle requesting contents belonging to the specific virtual building, to the current owner of the specific virtual building as the game cash, according to a first game cash acquisition rate data corresponding to the current owner of the specific virtual building, and wherein the second profit algorithm provides a second portion of regional profits, which is at least part of the game profits generated from the siege battle fees or from the siege battle requesting contents belonging to a specific virtual region having a plurality of the virtual buildings including the specific virtual building, to the current owner of the specific virtual building, as the game cash according to a second game cash acquisition rate data corresponding to the current owner of the specific virtual building.

19. The game server of claim 14, wherein the processor performs or supports another device to perform a process of forming the siege battle requesting contents by referring to at least part of data from (i) specific building data including at least part of information on a location of the specific actual building, store brands in the specific actual building, owners of the specific actual building, surrounding commercial districts, and users who visit the specific actual building corresponding to the specific virtual building, (ii) specific regional data including at least part of information on a location of the specific actual region, region visitors who visit the specific actual region, tourist sites near the specific actual region, surrounding commercial districts of the specific actual region in which the specific actual building is located, and (iii) specific correlation data representing correlation between the specific building data and the specific regional data.

20. The game server of claim 14, wherein, before the process of (I), the processor performs or supports another device to perform processes of:
(i) classifying the virtual buildings into landmarks and general buildings by referring to building metadata of the virtual buildings located in the virtual regions on the virtual maps corresponding to the actual buildings located in the actual regions on the actual maps, wherein the building metadata includes at least part of the building level data, the building characteristics data, the game cash acquisition rate data, the item production rate data, and the character buff-rate data corresponding to the virtual buildings; and (ii) assigning higher numerical values to at least part of first character buff-rate data, first item production rate data and first game cash acquisition rate data of the landmarks as compared to at least part of second character buff-rate data, second item production rate data and second game cash acquisition rate data of the general buildings.

21. The game server of claim 14, wherein the processor performs or supports another device to perform processes of:
(i) providing a user interface that allows the current owner occupying the specific virtual building to display message contents on a signboard placed on the specific virtual building; and
(ii) in response to a specific message content being entered through the user interface, supporting a display of the specific message content on the signboard placed on the specific virtual building through a screen of a terminal of another user approaching the specific virtual building at the first state.

22. The game server of claim 14, wherein, on condition that the building characteristics data and character properties data have been classified into a first type to a z type and on condition that incompatible type pairs and superiorities between the first type to the z type have been set, the processor performs or supports another device to perform processes of:
(i) comparing $(1\_1)$-st character properties data to $(1\_i)$-th character properties data with at least part of specific building characteristics data and $(2\_1)$-st character properties data to $(2\_j)$-th character properties data, wherein the $(1\_1)$-st character properties data to the $(1\_i)$-th character properties data correspond to the $(1\_1)$-st participating character to the $(1\text{-}i)$-th participating character of the first player, wherein the specific building characteristics data correspond to the specific virtual building and wherein the $(2\_1)$-st character properties data to the $(2\_j)$-th character properties data correspond to the $(2\_1)$-st participating character to the $(2\text{-}j)$-th participating character of the second player; and thus
(ii) allowing attack power advantages to at least part of the $(1\_1)$-st participating character to the $(1\text{-}i)$-th participating character in case at least part of the $(1\_1)$-st character properties data to the $(1\text{-}i)$-th character properties data are determined as having superiorities to at least part of the specific building characteristics data and the $(2\_1)$-st character properties data to the $(2\_j)$-th character properties data; and
(iii) allowing defense power advantages to at least part of the specific building and the $(2\_1)$-st participating character to the $(2\_j)$-th participating character in case at least part of the specific building characteristics data and the $(2\_1)$-st character properties data to the $(2\_j)$-th character properties data are determined as having superiorities to at least part of the $(1\_1)$-st character properties data to the $(1\text{-}i)$-th character properties data.

23. The game server of claim 14, wherein, in response to detecting that (i) the current owner occupying the specific virtual building has collected game cash for performing building reinforcements, (ii) the current owner has collected one or more building reinforcement items for performing the building reinforcements, and (iii) building reinforcement waiting time corresponding to a specific building level of the specific virtual building has been passed, the processor performs or supports another device to perform processes of allowing the current owner to perform the building reinforcements on the specific virtual building and thus allowing the building defense power to be increased through the building reinforcements.

24. The game server of claim 23, wherein the processor performs or supports another device to perform a process of allowing the current owner to shorten the building reinforcement waiting time by using one or more waiting time shortening contents, wherein the waiting time shortening contents are selected by referring to at least part of specific building data of the specific actual building corresponding to the specific virtual building, specific regional data of the specific actual region in which the specific actual building is located, and specific correlation data representing correlation between the specific building data and the specific regional data.

25. The game server of claim 14, wherein, at the process of (I), if the location information of the first player is determined as not included in location information history of the first player, the processor performs or supports another device to perform processes of displaying one or more new region visiting contents corresponding to the location information of the first player on the first terminal of the first player, and providing one or more predetermined rewards corresponding to the new region visiting contents to the first player in a form of game cash.

26. The game server of claim 14, wherein, at the process of (III), the processor performs or supports another device to perform processes of allowing the second player to select the $(2\_1)$-st participating character to the $(2\_j)$-th participating character from the $(2\_1)$-st character to the $(2\_m)$-th character as a regular defense unit that is allowed to participate in the siege battle regardless of whether the second player is logged in or not, and allowing the second player to increase a size of the regular defense unit by paying predetermined amounts of building reinforcement items having predetermined types.

* * * * *